# (12) United States Patent
Yamuna et al.

(10) Patent No.: US 9,742,640 B2
(45) Date of Patent: *Aug. 22, 2017

(54) IDENTIFYING COMPATIBLE WEB SERVICE POLICIES

(71) Applicant: ORACLE INTERNATIONAL CORPORATION, Redwood Shores, CA (US)

(72) Inventors: Prakash Yamuna, Union City, CA (US); Nickolas Kavantzas, Emerald Hills, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 287 days.

This patent is subject to a terminal disclaimer.

(21) Appl. No.: 14/148,400

(22) Filed: Jan. 6, 2014

(65) Prior Publication Data

US 2014/0129706 A1    May 8, 2014

Related U.S. Application Data

(63) Continuation of application No. 13/149,037, filed on May 31, 2011, now Pat. No. 8,650,250.

(Continued)

(51) Int. Cl.
*G06F 15/173* (2006.01)
*H04L 12/26* (2006.01)
(Continued)

(52) U.S. Cl.
CPC .............. *H04L 43/04* (2013.01); *H04L 12/66* (2013.01); *H04L 63/102* (2013.01); *H04L 67/02* (2013.01)

(58) Field of Classification Search
CPC ................................ H04L 43/04; H04L 12/66
(Continued)

(56) References Cited

U.S. PATENT DOCUMENTS

| 5,797,128 A | 8/1998 | Birnbaum |
| 5,889,953 A | 3/1999 | Thebaut et al. |

(Continued)

OTHER PUBLICATIONS

US 9,195,468, 11/2015, Fillipi et al. (withdrawn)
(Continued)

*Primary Examiner* — Joseph E Avellino
*Assistant Examiner* — Marshall McLeod
(74) *Attorney, Agent, or Firm* — Kilpatrick Townsend & Stockton LLP

(57) ABSTRACT

Methods, systems, and devices are described for identifying compatible web service policies between a web service and a web service client. A first and second set of one or more identifiers linked to web service policies supported by the web service and web service client may be calculated, respectively. The sets of identifiers may be compared. Using the comparison, a number of common identifiers present in the first set of one or more identifiers linked to the web service policies supported by the web service and the second set of one or more identifiers linked to the web service policies supported by the web service client may be identified. Using the number of common identifiers, a web service policy of the web service compatible with a web service policy of the web service client may be identified.

20 Claims, 6 Drawing Sheets

Related U.S. Application Data

(60) Provisional application No. 61/417,172, filed on Nov. 24, 2010.

(51) Int. Cl.
  *H04L 12/66* (2006.01)
  *H04L 29/06* (2006.01)
  *H04L 29/08* (2006.01)

(58) Field of Classification Search
  USPC .................. 709/224, 201, 203, 204, 223
  See application file for complete search history.

(56) References Cited

U.S. PATENT DOCUMENTS

| | | |
|---|---|---|
| 6,064,656 A | 5/2000 | Angal et al. |
| 6,167,445 A | 12/2000 | Gai et al. |
| 6,381,639 B1 | 4/2002 | Thebaut et al. |
| 6,516,416 B2 | 2/2003 | Gregg et al. |
| 6,578,076 B1 | 6/2003 | Putzolu |
| 6,944,183 B1 | 9/2005 | Iyer et al. |
| 6,952,728 B1 | 10/2005 | Alles et al. |
| 7,197,741 B1 | 3/2007 | Stapf |
| 7,213,068 B1 | 5/2007 | Kohli et al. |
| 7,290,288 B2 | 10/2007 | Gregg et al. |
| 7,350,204 B2 | 3/2008 | Lambert et al. |
| 7,424,702 B1 | 9/2008 | Vinodkrishnan et al. |
| 7,444,643 B2 | 10/2008 | Lo et al. |
| 7,478,419 B2 | 1/2009 | Anderson et al. |
| 7,543,276 B2 | 6/2009 | Pfander et al. |
| 7,607,164 B2 | 10/2009 | Vasishth et al. |
| 7,725,605 B2 | 5/2010 | Palmeri et al. |
| 7,796,760 B2 | 9/2010 | Brettle et al. |
| 7,855,972 B2 | 12/2010 | Pettit et al. |
| 7,877,264 B2 | 1/2011 | Fox et al. |
| 7,877,409 B2 | 1/2011 | Lim |
| 8,005,930 B2 | 8/2011 | Abeln et al. |
| 8,104,080 B2 | 1/2012 | Burns et al. |
| 8,145,784 B2 | 3/2012 | See et al. |
| 8,156,538 B2 | 4/2012 | Kanade et al. |
| 8,265,969 B2 | 9/2012 | Comstock et al. |
| 8,307,413 B2 | 11/2012 | Smadja et al. |
| 8,417,709 B2 | 4/2013 | Chiticariu et al. |
| 8,448,216 B2 | 5/2013 | Liu et al. |
| 8,484,693 B2 | 7/2013 | Cox et al. |
| 8,560,819 B2 | 10/2013 | Fillipi et al. |
| 8,635,682 B2 | 1/2014 | Kavantzas et al. |
| 8,650,250 B2 | 2/2014 | Yamuna et al. |
| 8,650,288 B2 | 2/2014 | Yamuna et al. |
| 8,726,349 B2 | 5/2014 | Kavantzas et al. |
| 8,875,306 B2 | 10/2014 | Lowes |
| 8,914,843 B2 | 12/2014 | Bryan et al. |
| 8,973,117 B2 | 3/2015 | Kavantzas et al. |
| 9,003,478 B2 | 4/2015 | Kavantzas et al. |
| 9,021,055 B2 | 4/2015 | Kavantzas et al. |
| 9,043,864 B2 | 5/2015 | Kavantzas et al. |
| 9,055,068 B2 | 6/2015 | Bryan et al. |
| 9,088,571 B2 | 7/2015 | Bryan et al. |
| 9,143,511 B2 | 9/2015 | Bryan et al. |
| 9,262,176 B2 | 2/2016 | Fillipi et al. |
| 2002/0124067 A1 | 9/2002 | Parupudi et al. |
| 2002/0143914 A1 | 10/2002 | Cihula |
| 2002/0184525 A1 | 12/2002 | Cheng |
| 2003/0023587 A1 | 1/2003 | Dennis et al. |
| 2003/0074367 A1 | 4/2003 | Kaler et al. |
| 2003/0115179 A1 | 6/2003 | Prabakaran et al. |
| 2003/0115484 A1 | 6/2003 | Moriconi et al. |
| 2003/0229501 A1 | 12/2003 | Copeland et al. |
| 2004/0015487 A1 | 1/2004 | Lin et al. |
| 2004/0015488 A1 | 1/2004 | Anonsen et al. |
| 2004/0039594 A1 | 2/2004 | Narasimhan et al. |
| 2004/0042470 A1 | 3/2004 | Cooper et al. |
| 2004/0103046 A1 | 5/2004 | Christoph et al. |
| 2004/0177139 A1 | 9/2004 | Schuba et al. |
| 2004/0181775 A1 | 9/2004 | Anonsen et al. |
| 2004/0189708 A1 | 9/2004 | Larcheveque et al. |
| 2005/0038790 A1 | 2/2005 | Wolthusen |
| 2005/0080914 A1 | 4/2005 | Lerner et al. |
| 2005/0086197 A1 | 4/2005 | Boubez et al. |
| 2005/0091352 A1 | 4/2005 | Alex et al. |
| 2005/0114243 A1 | 5/2005 | Scumniotales et al. |
| 2005/0223109 A1 | 10/2005 | Mamou et al. |
| 2006/0041565 A1 | 2/2006 | Cuomo et al. |
| 2006/0053120 A1 | 3/2006 | Shum et al. |
| 2006/0075465 A1 | 4/2006 | Ramanathan et al. |
| 2006/0088276 A1 | 4/2006 | Cho et al. |
| 2006/0089938 A1 | 4/2006 | Leonard et al. |
| 2006/0117063 A1 | 6/2006 | Havewala et al. |
| 2006/0206440 A1* | 9/2006 | Anderson .......... G06F 9/44505 705/500 |
| 2006/0230430 A1 | 10/2006 | Hondo et al. |
| 2006/0282876 A1 | 12/2006 | Shelest et al. |
| 2007/0006278 A1 | 1/2007 | Ioan Avram et al. |
| 2007/0118576 A1 | 5/2007 | Moore et al. |
| 2007/0157287 A1 | 7/2007 | Lim |
| 2007/0204324 A1 | 8/2007 | Roberts et al. |
| 2007/0266032 A1 | 11/2007 | Blumenau |
| 2007/0266422 A1 | 11/2007 | Germano et al. |
| 2007/0282879 A1 | 12/2007 | Degenkolb et al. |
| 2008/0040364 A1 | 2/2008 | Li |
| 2008/0046335 A1 | 2/2008 | Zhou |
| 2008/0046961 A1 | 2/2008 | Pouliot |
| 2008/0065466 A1 | 3/2008 | Liu et al. |
| 2008/0066189 A1 | 3/2008 | Liu et al. |
| 2008/0071805 A1 | 3/2008 | Mourra et al. |
| 2008/0091682 A1 | 4/2008 | Lim |
| 2008/0098453 A1 | 4/2008 | Hinton et al. |
| 2008/0148345 A1 | 6/2008 | Rubio |
| 2008/0155641 A1 | 6/2008 | Beavin et al. |
| 2008/0184201 A1 | 7/2008 | Burns et al. |
| 2008/0189760 A1 | 8/2008 | Rosenberg et al. |
| 2008/0225748 A1 | 9/2008 | Khemani et al. |
| 2008/0229381 A1 | 9/2008 | Sikka et al. |
| 2008/0244692 A1 | 10/2008 | Chang |
| 2008/0244693 A1 | 10/2008 | Chang |
| 2008/0256593 A1 | 10/2008 | Vinberg et al. |
| 2008/0288651 A1 | 11/2008 | Brauel et al. |
| 2008/0301757 A1 | 12/2008 | Demarest et al. |
| 2008/0320550 A1 | 12/2008 | Strassner et al. |
| 2009/0049518 A1 | 2/2009 | Roman et al. |
| 2009/0070853 A1 | 3/2009 | Chung et al. |
| 2009/0099860 A1 | 4/2009 | Karabulut et al. |
| 2009/0099882 A1 | 4/2009 | Karabulut |
| 2009/0106816 A1 | 4/2009 | Ito |
| 2009/0125612 A1 | 5/2009 | Rabetge et al. |
| 2009/0150824 A1 | 6/2009 | Furuichi |
| 2009/0177929 A1 | 7/2009 | Sijelmassi |
| 2009/0193057 A1 | 7/2009 | Maes |
| 2009/0205013 A1 | 8/2009 | Lowes |
| 2009/0281996 A1 | 11/2009 | Liu et al. |
| 2009/0300712 A1 | 12/2009 | Kaufmann et al. |
| 2010/0030890 A1 | 2/2010 | Dutta et al. |
| 2010/0064184 A1 | 3/2010 | Almeida et al. |
| 2010/0077455 A1 | 3/2010 | Nishio et al. |
| 2010/0100810 A1 | 4/2010 | Nakamura et al. |
| 2010/0115075 A1 | 5/2010 | Chen et al. |
| 2010/0125477 A1 | 5/2010 | Mousseau et al. |
| 2010/0125665 A1 | 5/2010 | Simpson et al. |
| 2010/0153695 A1 | 6/2010 | Bussard et al. |
| 2010/0175105 A1 | 7/2010 | Vasishth et al. |
| 2010/0217853 A1 | 8/2010 | Alexander et al. |
| 2010/0235915 A1 | 9/2010 | Memon et al. |
| 2010/0269148 A1 | 10/2010 | Almeida et al. |
| 2010/0281455 A1 | 11/2010 | Anand et al. |
| 2010/0281516 A1 | 11/2010 | Lerner et al. |
| 2011/0035650 A1 | 2/2011 | Jardine-Skinner et al. |
| 2011/0047451 A1 | 2/2011 | Jardine-Skinner et al. |
| 2011/0131275 A1 | 6/2011 | Maida-Smith et al. |
| 2011/0302239 A1 | 12/2011 | Grateau et al. |
| 2011/0321122 A1 | 12/2011 | Mwangi et al. |
| 2012/0054163 A1 | 3/2012 | Liu et al. |
| 2012/0054496 A1 | 3/2012 | Abeln et al. |
| 2012/0093031 A1 | 4/2012 | Wang et al. |
| 2012/0102182 A1 | 4/2012 | Voskuil et al. |

(56) References Cited

U.S. PATENT DOCUMENTS

| | | | |
|---|---|---|---|
| 2012/0110093 | A1 | 5/2012 | Tingstrom et al. |
| 2012/0131091 | A1 | 5/2012 | Yamuna et al. |
| 2012/0131134 | A1 | 5/2012 | De Foy et al. |
| 2012/0131135 | A1 | 5/2012 | Yamuna et al. |
| 2012/0131164 | A1 | 5/2012 | Bryan et al. |
| 2012/0131469 | A1 | 5/2012 | Yamuna et al. |
| 2012/0131641 | A1 | 5/2012 | Kavantzas et al. |
| 2012/0131654 | A1 | 5/2012 | Kavantzas et al. |
| 2012/0216100 | A1 | 8/2012 | Jardine-Skinner et al. |
| 2012/0311309 | A1 | 12/2012 | Fillipi et al. |
| 2012/0311658 | A1 | 12/2012 | Dozier |
| 2013/0086184 | A1 | 4/2013 | Kavantzas et al. |
| 2013/0086240 | A1 | 4/2013 | Bryan et al. |
| 2013/0086241 | A1 | 4/2013 | Bryan et al. |
| 2013/0086242 | A1 | 4/2013 | Bryan et al. |
| 2013/0086626 | A1 | 4/2013 | Kavantzas et al. |
| 2013/0086627 | A1 | 4/2013 | Bryan et al. |
| 2013/0262646 | A1 | 10/2013 | Fiebig et al. |
| 2013/0347062 | A1 | 12/2013 | Matityahu et al. |
| 2014/0013092 | A1 | 1/2014 | Fillipi et al. |
| 2014/0096188 | A1 | 4/2014 | Mont et al. |
| 2014/0109195 | A1 | 4/2014 | Kavantzas et al. |
| 2014/0179271 | A1 | 6/2014 | Guccione et al. |

OTHER PUBLICATIONS

Notice of Allowance for U.S. Appl. No. 14/026,767 (Dec. 8, 2015), all pages.
Final Office Action for U.S. Appl. No. 13/118,947 mailed on Feb. 16, 2016, all pages.
Ion et al., Extending the Java Virtual Machine to Enforce Fine-Grained Security Policies in Mobile Devices, Twenty-Third Annual Computer Security Applications Conference, Dec. 2007, pp. 233-242.
Montanari et al., Policy-based Separation of Concerns for Dynamic Code Mobility Management, Proceedings of the 27th Annual International Computer Software and Applications Conference, Nov. 2003, pp. 82-90.
Schuba et al., Scaling Network Services Using Programmable Network Devices, IEEE Computer Society, vol. 38, No. 4, Apr. 2005, pp. 52-60.
U.S. Appl. No. 13/118,947, Final Office Action mailed on Jan. 15, 2015, 32 pages.
U.S. Appl. No. 13/149,065, Notice of Allowance mailed on Dec. 29, 2014, 10 pages.
U.S. Appl. No. 13/436,933, Notice of Allowance mailed on Jan. 21, 2015, 21 pages.
U.S. Appl. No. 13/596,525, Final Office Action mailed on Nov. 26, 2014, 15 pages.
U.S. Appl. No. 13/596,525, Notice of Allowance mailed on Mar. 13, 2015, 12 pages.
U.S. Appl. No. 13/596,545, Notice of Allowance mailed on Nov. 25, 2014, 15 pages.
U.S. Appl. No. 13/596,861, Notice of Allowance mailed on Mar. 13, 2015, 22 pages.
U.S. Appl. No. 13/596,891, Notice of Allowance mailed on Feb. 2, 2015, 5 pages.
U.S. Appl. No. 14/106,037, Notice of Allowance mailed on Oct. 24, 2014, 9 pages.
U.S. Appl. No. 13/118,940, filed May 31, 2011.
U.S. Appl. No. 13/149,049, filed May 31, 2011.
U.S. Appl. No. 14/106,037, filed Dec. 13, 2013.
U.S. Appl. No. 13/149,065, filed May 31, 2011.
U.S. Appl. No. 13/118,944, filed May 31, 2011.
U.S. Appl. No. 13/118,947, filed May 31, 2011.
U.S. Appl. No. 14/026,767, filed Sep. 13, 2013.
U.S. Appl. No. 13/436,940, filed Mar. 31, 2012.
U.S. Appl. No. 13/118,876, filed May 31, 2011.
U.S. Appl. No. 13/596,545, filed Aug. 28, 2012.
U.S. Appl. No. 13/596,891, filed Aug. 28, 2012.
U.S. Appl. No. 13/596,861, filed Aug. 28, 2012.
U.S. Appl. No. 13/596,525, filed Aug. 28, 2012.
U.S. Appl. No. 13/436,933, filed Mar. 31, 2012.
U.S. Appl. No. 13/149,037, May 1, 2013, Non-Final Office Action.
U.S. Appl. No. 13/149,037, Oct. 8, 2013, Notice of Allowance.
U.S. Appl. No. 13/118,940, Feb. 13, 2013, Non-Final Office Action.
U.S. Appl. No. 13/118,940, Aug. 29, 2013, Final Office action.
U.S. Appl. No. 13/118,940, Jan. 15, 2014, Notice of Allowance.
U.S. Appl. No. 13/149,049, Mar. 5, 2013, Non-Final Office Action.
U.S. Appl. No. 13/149,049, Sep. 17, 2013, Notice of Allowance.
U.S. Appl. No. 13/118,876, Jun. 12, 2013, Notice of Allowance.
U.S. Appl. No. 13/118,944, May 16, 2013, Non-Final Office Action.
U.S. Appl. No. 13/118,944, Oct. 10, 2013, Notice of Allowance.
U.S. Appl. No. 13/118,944, Dec. 16, 2013, Corrected Notice of Allowance.
U.S. Appl. No. 13/436,940, Jul. 15, 2013, Non-Final Office Action.
U.S. Appl. No. 13/436,940, Jan. 28, 2014, Final Office Action.
U.S. Appl. No. 13/436,940, Apr. 22, 2014, Advisory Action.
U.S. Appl. No. 13/118,947, May 15, 2014, No Office Actions as of this date.
U.S. Appl. No. 13/436,933, Feb. 20, 2014, Non-Final Office Action.
U.S. Appl. No. 14/148,400, May 15, 2014, No Office Actions to Date.
U.S. Appl. No. 14/106,037, May 15, 2014, No Office Actions to Date.
U.S. Appl. No. 13/149,065, Dec. 4, 2012, Non-Final Office Action.
U.S. Appl. No. 13/149,065, Jul. 3, 2013, Final Office Action.
U.S. Appl. No. 14/026,767, Mar. 4, 2014, Non-Final Office Action.
U.S. Appl. No. 13/596,545, May 15, 2014, No Office Actions to Date.
U.S. Appl. No. 13/596,861, Apr. 10, 2014, Non-Final Office Action.
U.S. Appl. No. 13/596,525, May 15, 2014, No Office Actions to Date.
U.S. Appl. No. 13/118,947, Non-Final Office Action mailed on Jun. 20, 2014, 31 pages.
U.S. Appl. No. 13/596,525, Non Final Office Action mailed on May 30, 2014, 15 pages.
U.S. Appl. No. 13/596,891, Non-Final Office Action mailed on Apr. 25, 2014, 10 pages.
U.S. Appl. No. 13/149,065, Non-Final Office Action mailed on Jul. 14, 2014, 23 pages.
U.S. Appl. No. 13/436,933, Final Office Action mailed on Aug. 29, 2014, 28 pages.
U.S. Appl. No. 13/436,940, Notice of Allowance mailed on Aug. 12, 2014, 13 pages.
U.S. Appl. No. 13/595,545, Non-Final Office Action mailed on Aug. 4, 2014, 27 pages.
U.S. Appl. No. 13/596,861, Final Office Action mailed on Oct. 3, 2014, 30 pages.
U.S. Appl. No. 13/596,891, Fatal Office Acton mailed on Oct. 2, 2014, 11 pages.
U.S. Appl. No. 14/026,767, Notice of Allowance mailed on Sep. 8, 2014, 9 pages.
U.S. Appl. No. 14/106,037, Non-Final Office Action mailed on Jul. 16, 2014, 16 pages.
U.S. Appl. No. 13/118,947, Non-Final Office Action mailed on Jul. 31, 2015, 37 pages.
U.S. Appl. No. 13/436,940, Corrected Notice of Allowability mailed on Nov. 21, 2014, 2 pages.
U.S. Appl. No. 13/596,891, Corrected Notice of Allowability mailed on Apr. 8, 2015, 2 pages.
U.S. Appl. No. 13/149,037, filed May 31, 2011.
U.S. Appl. No. 13/436,940, Aug. 12, 2014, Notice of Allowance.
U.S. Appl. No. 13/436,940, Nov. 21, 2014, Corrected Notice of Allowability.
U.S. Appl. No. 13/118,947, Jun. 20, 2014, Non-Final Office Action.
U.S. Appl. No. 13/118,947, Jan. 15, 2015, Final Office Action.
U.S. Appl. No. 13/118,947, Jul. 31, 2015, Non-Final Office Action.
U.S. Appl. No. 13/436,933, Aug. 29, 2014, Final Office Action.
U.S. Appl. No. 13/436,933, Jan. 21, 2015, Notice of Allowance.
U.S. Appl. No. 14/106,037, Jul. 16, 2014, Non-Final Office Action.
U.S. Appl. No. 14/106,037, Oct. 24, 2014, Notice of Allowance.
U.S. Appl. No. 13/149,065, Jul. 14, 2014, Non-Final Office Action.

(56) References Cited

OTHER PUBLICATIONS

U.S. Appl. No. 13/149,065, Dec. 29, 2014, Notice of Allowance.
U.S. Appl. No. 14/026,767, Sep. 8, 2014, Notice of Allowance.
U.S. Appl. No. 13/596,545, Aug. 4, 2014, Non-Final Office Action.
U.S. Appl. No. 13/596,545, Nov. 25, 2014, Notice of Allowance.
U.S. Appl. No. 13/596,861, Oct. 3, 2014, Final Office Action.
U.S. Appl. No. 13/596,861, Mar. 13, 2015, Notice of Allowance.
U.S. Appl. No. 13/596,891, Apr. 25, 2014, Non-Final Office Action.
U.S. Appl. No. 13/596,891, Oct. 2, 2014, Final Office Action.
U.S. Appl. No. 13/596,891, Feb. 2, 2015, Notice of Allowance.
U.S. Appl. No. 13/596,891, Apr. 8, 2015, Corrected Notice of Allowability.
U.S. Appl. No. 13/596,525, May 30, 2014, Non-Final Office Action.
U.S. Appl. No. 13/596,525, Nov. 26, 2014, Final Office Action.
U.S. Appl. No. 13/596,525, Mar. 13, 2015, Notice of Allowance.
U.S. Appl. No. 13/118,947, Notice of Allowance mailed on Oct. 19, 2016, 19 pages.
U.S. Appl. No. 13/118,876, Notice of Allowance dated Jun. 12, 2013, 9 pages.
U.S. Appl. No. 13/118,940, Final Office Action dated Aug. 29, 2013, 10 pages.
U.S. Appl. No. 13/118,940, Non-Final Office Action dated Feb. 13, 2013, 9 pages.
U.S. Appl. No. 13/118,940, Notice of Allowance dated Jan. 15, 2014, 5 pages.
U.S. Appl. No. 13/118,944, Corrected Notice of Allowance dated Dec. 16, 2013, 5 pages.
U.S. Appl. No. 13/118,944, Non Final Office Action dated May 16, 2013, 31 pages.
U.S. Appl. No. 13/118,944, Notice of Allowance dated Oct. 10, 2013, 10 pages.
U.S. Appl. No. 13/149,037, Non-Final Office Action dated May 1, 2013, 9 pages.
U.S. Appl. No. 13/149,037, Notice of Allowance dated Oct. 8, 2013, 7 pages.
U.S. Appl. No. 13/149,049, Non-Final Office Action dated Mar. 5, 2013, 15 pages.
U.S. Appl. No. 13/149,049, Notice of Allowance dated Sep. 17, 2013, 10 pages.
U.S. Appl. No. 13/149,065, Final Office Action dated Jul. 3, 2013, 21 pages.
U.S. Appl. No. 13/149,065, Non-Final Office Action dated Dec. 4, 2012, 30 pages.
U.S. Appl. No. 13/149,065, Advisory Action dated Sep. 17, 2013, 5 pages.
U.S. Appl. No. 13/436,933, Non-Final Office Action dated Feb. 20, 2014, 25 pages.
U.S. Appl. No. 13/436,940, Final Office Action dated Jan. 28, 2014, 22 pages.
U.S. Appl. No. 13/436,940, Non-Final Office Action dated Jul. 15, 2013, 31 pages.
U.S. Appl. No. 13/436,940, Advisory Action dated Apr. 22, 2014, 3 pages.
U.S. Appl. No. 13/596,861, Non-Final Office Action dated Apr. 10, 2014, 29 pages.
U.S. Appl. No. 14/026,767, Non-Final Office Action dated Mar. 4, 2014, 7 pages.
Bajaj et al., Web Services Policy Framework (WS-Policy), BEA systems Inc. et al. version 1.2, Mar. 2006, 29 pages.
Christensen et al., Web Services Description Language (WSDL), World Wide Web Consortium, version 1.1., Mar. 2001, 29 pages.
Nordbotten, XML and Web Services Security Standards, Communications Surveys & Tutorials, IEEE, vol. 11, No. 3, Oct. 3, 2009, pp. 4-21.
Phan et al., Quality-Driven Business Policy Specification and Refinement for Service-Oriented Systems, Springer-Verlag Berlin Heidelberg, 2008, pp. 5-21.
Shute et al., DataPower SOA Appliance Service Planning, Implementation, and Best Practices, IBM Redbook, Jun. 28, 2011, 160 pages.

* cited by examiner

US 9,742,640 B2

IDENTIFYING COMPATIBLE WEB SERVICE POLICIES

CROSS-REFERENCES TO RELATED APPLICATIONS

This application is a continuation of U.S. patent application Ser. No. 13/149,037 filed May 31, 2011 and entitled "IDENTIFYING COMPATIBLE WEB SERVICE POLICIES," which claims priority from U.S. Provisional Patent Application No. 61/417,172, filed Nov. 24, 2010, entitled "Identifying Compatible Client Policies Using A Smart Digest", each of which is hereby incorporated by reference, as if set forth in full in this document, for all purposes.

This application is also related to the following U.S. Patent Applications, each of which is hereby incorporated by reference, as if set forth in full in this document, for all purposes: (1) U.S. application Ser. No. 13/118,940, entitled "Optimizing Interactions Between Co-Located Processes;" (2) U.S. application Ser. No. 13/149,049, entitled "Propagating Security Identity Information to Components of a Composite Application;" (3) U.S. application Ser. No. 13/149,065, entitled "Nonconforming Web Service Policy Functions;" (4) U.S. application Ser. No. 13/118,944, entitled "Runtime Usage Analysis For A Distributed Policy Enforcement System;" and (5) U.S. application Ser. No. 13/118,947, entitled "Attaching Web Service Policies To A Group Of Policy Subjects," all of which were filed on May 31, 2011.

BACKGROUND

The present invention relates, in general, to web services and, in particular, to identifying compatible web service policies between web services and web service clients.

For a web service client to utilize a service provided by a web service, security that is supported by each of these entities may be required to be implemented. The web service may transmit a web service policy document identifying one or more web service policies supported by the web service (these web service policies are referred to as "service policies"). The web service client also has web service policies that it supports (these web service policies are referred to as "client policies"). In order for the web service client and the web service to interact, web service policies at the web service and web service client can be implemented that are compatible with each other. To do this, an analysis may be conducted to identify compatible client policies and service policies.

Such analysis may be time-consuming and computationally expensive. For instance, a user may need to wait while a computationally demanding algorithm (e.g., a WS-Policy Normalization and Intersection algorithm) is performed to identify compatible client policies and service policies.

SUMMARY

In some embodiments, a method for identifying compatible web service policies between a web service and a web service client is presented. The method may include calculating, by a computer system, a first set of one or more identifiers linked with one or more web service policies supported by the web service. Each identifier of the first set of one or more identifiers may be linked with a first set of assertions of the corresponding web service policy. The method may include calculating, by the computer system, a second set of one or more identifiers linked with one or more web service policies supported by the web service client. Each identifier of the second set of one or more identifiers may be linked with a second set of assertions of the corresponding web service policy. The method may include comparing, by the computer system, the first set of one or more identifiers linked with the web service policies supported by the web service with the second set of one or more identifiers linked with the web service policies supported by the web service client. The method may include identifying, by the computer system, using the comparison of the first set of one or more identifiers and the second set of one or more identifiers, a web service policy supported by the web service that is compatible with a web service policy supported by the web service client.

In some embodiments, the method includes receiving, by the web service client, a web service policy document from the web service, wherein the web service policy document comprises an indication of the web service policies supported by the web service. In some embodiments, the method includes calculating a first set of one or more hashes based on content of each of the web service policies supported by the web service. In some embodiments, the method includes calculating a second set of one or more hashes based on the content of web services supported by the web service client. In some embodiments, the content of each of the web service policies is used to calculate the first and second sets of one or more hashes comprises assertions but not declarations. In some embodiments, calculating the first set of one or more identifiers linked with web service policies supported by the web service comprises calculating identifiers for different versions of WS-Policy. In some embodiments, the method includes presenting, via a user terminal, a list comprising at least one web service policy of the web service identified as compatible with at least one web service policy of the web service client. In some embodiments, the method includes receiving, via the user terminal, a selection of a web service policy from a user, wherein the web service policy indicated by the selection was presented to the user on the list.

In some embodiments, a computer program product residing on a non-transitory processor-readable medium and comprising processor-readable instructions is presented. The instructions may be configured to cause a processor to calculate a first set of one or more identifiers linked to web service policies supported by the web service. The instructions may also be configured to cause the processor to calculate a second set of one or more identifiers linked with one or more web service policies supported by the web service client. The instructions may also be configured to cause the processor to compare the first set of one or more identifiers linked with the web service policies supported by the web service with the second set of one or more identifiers linked with the web service policies supported by the web service client. The instructions may also be configured to cause the processor to identify, using the comparison, a number of common identifiers present in the first set of one or more identifiers linked to the web service policies supported by the web service and the second set of one or more identifiers linked to the web service policies supported by the web service client. Further, the instructions may also be configured to cause the processor to identify, using the number of common identifiers, a web service policy of the web service compatible with a web service policy of the web service client.

In some embodiments, a system for identifying compatible web service policies between a web service and a web service client is presented. The system may include a web service client computer system. The web service client computer system may be configured to receive a web service policy document from a web service computer system. The web service client computer system may also be configured to calculate a first set of one or more identifiers linked with one or more web service policies supported by the web service. The web service client computer system may also be configured to calculate a second set of one or more identifiers linked with one or more web service policies supported by the web service client. The web service client computer system may also be configured to compare the first set of one or more identifiers linked with the web service policies supported by the web service with the second set of one or more identifiers linked to the web service policies supported by the web service client. The web service client computer system may also be configured to identify, using the comparison, a number of common identifiers present in the first set of one or more identifiers linked to the web service policies supported by the web service and the second set of one or more identifiers linked to the web service policies supported by the web service client. Further, the web service client computer system may be configured to identify, using the number of common identifiers, a web service policy of the web service compatible with a web service policy of the web service client.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Rather than performing a computationally demanding and/or time consuming algorithm to identify compatible service policies and client policies, a more efficient way of identifying the same compatible web service policies may be used. For each client policy, one or more identifiers (e.g., numbers, strings of characters) linked with the specific assertions within each branch of the client policy and linked with the version of WS-Policy can be created. When a web service policy document containing service policies supported by a web service is received by the web service client, one or more identifiers can be created in a similar manner and linked with the corresponding service policy.

The identifiers linked with the service policies may be used to search the identifiers linked with the client policies. When identifiers with the same value that are linked with a service policy and a client policy are identified, web service policies that are mutually compatible have likely been located. A user can be presented with a listing of the web service policies compatible with the web service and the web service client. From this listing, the user may select a web service policy that he desires to be implemented for security between the web service and web service client. Such use of identifiers to identify likely compatible client policies and service policies may be less computationally demanding and/or less time consuming than other algorithms.

Figure 1:
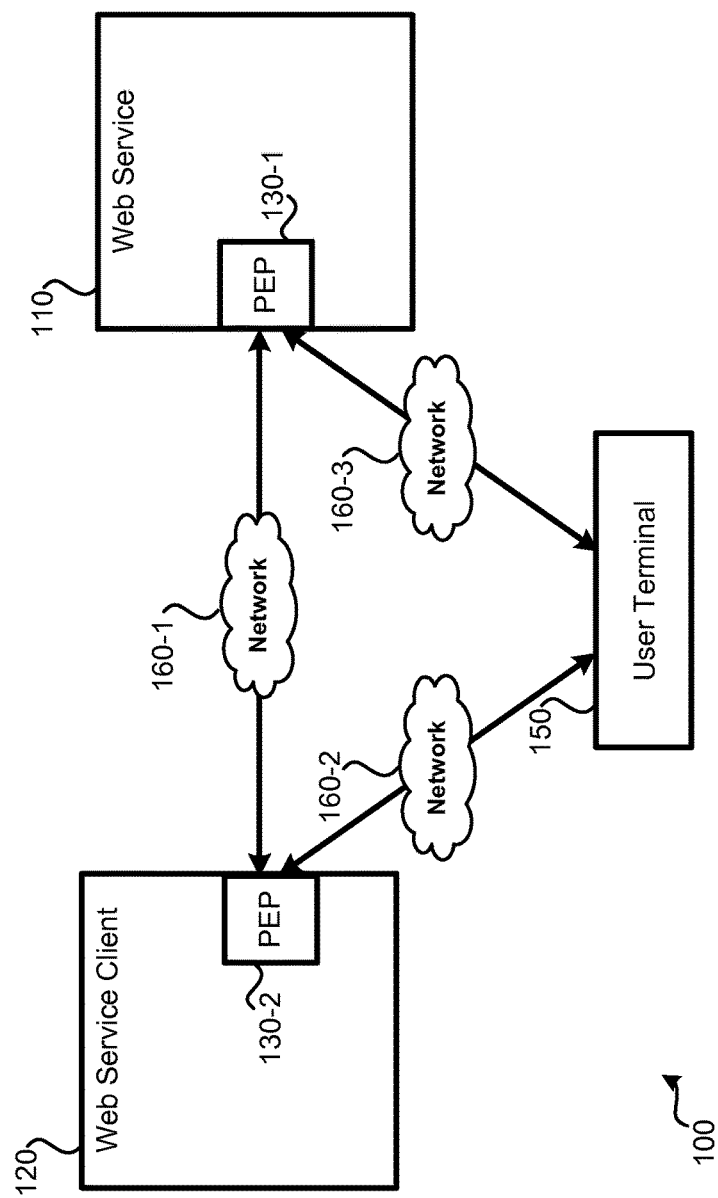
FIG. 1 illustrates an embodiment of a system for communicating between a web service and a web service client.

FIG. 1 illustrates an embodiment of a system 100 for communicating between a web service and a web service client. System 100 includes: web service 110, web service client 120, policy enforcement points 130, user terminal 150, and network(s) 160. Web service 110 can communicate with other entities, such as web service client 120, and provide one or more web services, such as database access. For example, web service client 120 may query web service 110 with a search string. Web service 110 may then return a response to the query. Web service 110 may communicate with web service client 120 using three varieties of programming language: Extensible Markup Language (XML), Standard Object Access Protocol (SOAP), and Web Services Definition Language (WSDL).

Web service client 120 may access web service 110 for one or more services. Policy Enforcement Points (PEPs) 130-1 and 130-2 are components of web service 110 and web service client 120, respectively. Policy Enforcement Points 130 ensure security policies for interaction between the web service and web service client are appropriately implemented. As such, for web service client 120 and web service 110 to interact, the security measures implemented by both web service client 120 and web service 110 may need to be compatible. As an example, policy enforcement point 130-1 may require that incoming requests from web service client 120 contain a username and password as parts of the request.

User terminal 150 may allow a user to interact with web service client 120 and web service 110. Web service 110, web service client 120, and user terminal 150 may communicate with each other directly or may communicate with each other via one or more networks 160. Network 160-1 may represent the same network as network 160-2 and/or 160-3. In some embodiments, each of networks 160 represent the Internet.

When web service client 120 makes initial contact with web service 110, web service 110 may transmit a web service policy document to web service client 120. The web service policy document, which may be coded using WSDL, contains various security requirements that the web service client is required by the web service to conform to in order to access the one or more services provided by web service 110. The web service policy document may contain requirements that web service client 120 perform "all" of a set of requirements. Alternatively, or additionally, the web service policy document may contain one or more web service policies that require web service client 120 to perform "exactly one" requirement of a set of requirements. As a basic example only, web service 110 may require that web service client 120 provide "exactly" one of: 1) a user and password; or 2) a security certificate in order to access web service 110. Alternatively, web service 110 may require that web service provide "all" of: 1) a user and password; and 2) a security certificate in order to access web service 110. A web service policy document may contain different requirements based on the version of WS-Policy supported by web service client 120. Web service policies identified in the web service policy document as compatible with the web service are referred to as "service policies" for short.

Web service 110 may transmit its web service policy document via network 160-1 to web service client 120. Web service client 120, possibly in conjunction with policy manager application 140, may identify service policies in the web service policy document that web service client 120 is compatible with. The web service policies that are identified as compatible between the web service client 120 and web service 110 may be implemented by policy enforcement points 130-2 and 130-1. Once implemented, web service client 120 may be able to transmit various requests to web service 110. Web service 110 may then respond and satisfy web service client 120's requests.

Figure 2:
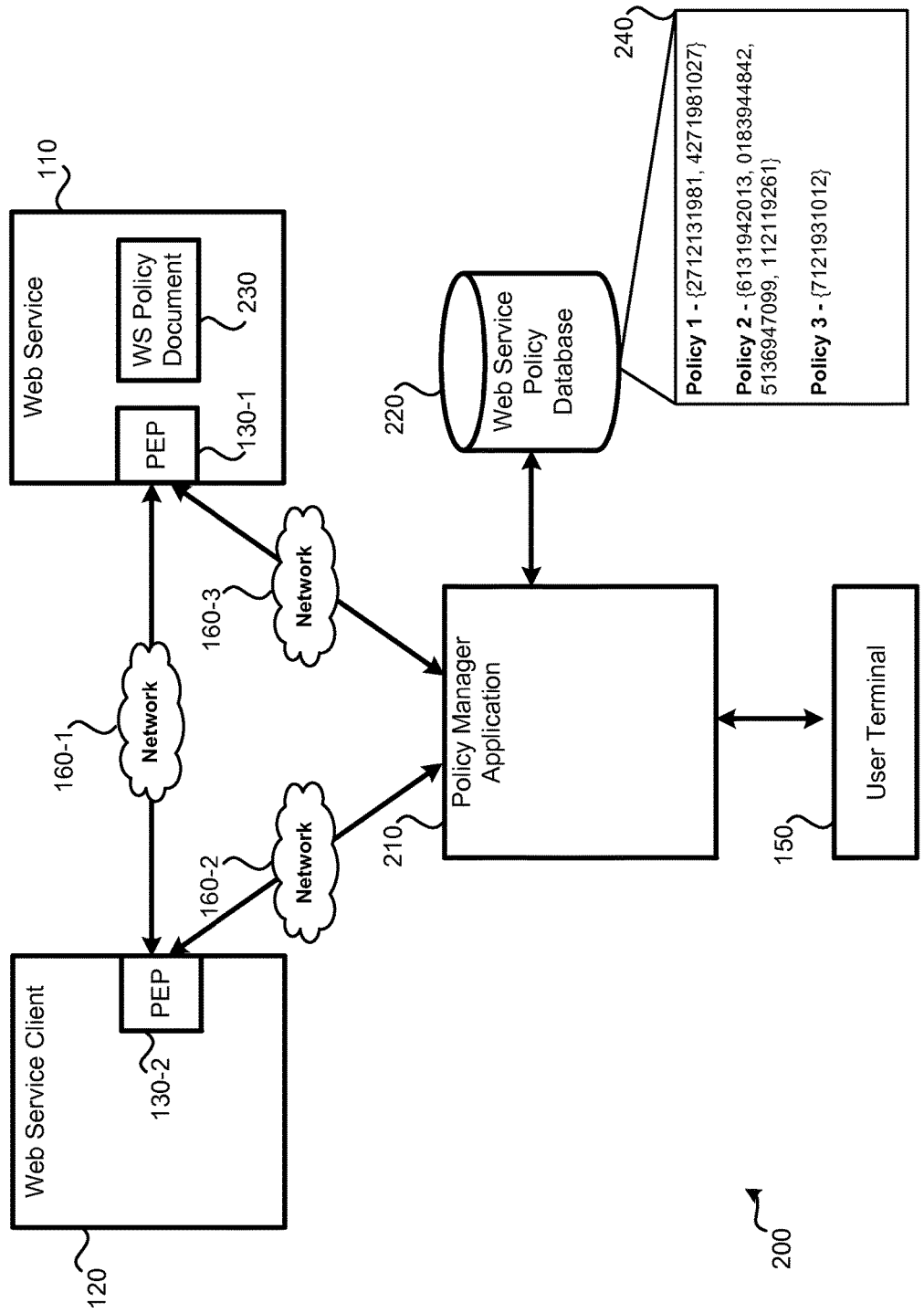
FIG. 2 illustrates an embodiment of a system for identifying compatible web service policies between a web service and a web service client.

FIG. 2 illustrates an embodiment of a system 200 for identifying compatible web service policies between a web service and a web service client. System 200 may represent the same system as system 100 of FIG. 1. System 200 may include: web service 110, web service client 120, user terminal 150, policy manager application 210, and web service policy database 220.

Policy manager application 210 may represent an application running on a computer system, which may be user terminal 150, the computer system running web service client 120, or some other computer system, that interacts with web service client 120 and/or web service 110 to coordinate the web service policies to be enforced during interaction between web service 110 and web service client 120. Policy manager application 210 may be in communication with web service policy database 220.

Web service policy database 220 may contain a listing of some or all of the web service policies that web service client 120 is capable of performing. Associated with each of the policies listed in web service policy database 220 are one or more identifiers. Each identifier may be a series of letters, numbers, and/or other symbols. Each of these identifiers represents a particular set of assertions in a particular version of WS-Policy. Within each web service policy, policy branches may be present. For example, if a web service policy requires that only one of a group of assertions be satisfied, a separate identifier may be present for each branch within the group. As an example, if a web service policy requires that web service client 120 transmit either 1) a username and password or 2) a security certificate to web service 110, a first identifier linked to the policy and the username and password option may be present, and a second identifier linked to the policy and the digital certificate option may be present. As such, each web service policy identified within web service policy database 220 may be linked with one or multiple identifiers.

Additionally, web service policies within web service policy database 220 can be linked to different versions of WS-Policy. For example, if a particular web service policy is used in three versions of WS-Policy, three (or more) identifiers may be linked with the web service policy. As such, if the web service policy contains multiple branches and is used in multiple versions of WS-Policy, many identifiers may be linked with the web service policy. As those with skill in the art will recognize, nested branches (that is, branches within branches) may be present in web service policies. As such, for each possible decision at a branch, a separate identifier may be present. How the identifiers linked to the web service policies of web service policy database 220 are created is discussed in relation to method 300 of FIG. 3.

Database entries 240 represent three database entries which may be present in the web service policy database 220. In system 200, policy one has two identifiers linked with it. Policy two has four identifiers linked with it, and, policy three has one identifier linked with it. Each of these identifiers may represent a specific set of assertions and version of WS-Policy. As such, if another policy is identified that has the same identifier, it can be expected that the web service policies are compatible.

As part of web service 110, web service policy document 230 is illustrated in FIG. 2. Web service policy document 230 may be transmitted by web service 110 via network 160-1 to web service client 120. Web service policy document 230 may contain various service policies compatible with web service 110. Web service client 120 may route web service policy document 230 to policy manager application 210 via network 160-2.

Policy manager application 210 may compute identifiers for the service policies identified in web service policy document 230. As with the various identifiers linked to the client policies present in web service policy database 220, different identifiers may be created for each branch within the web service policies present in web service policy document 230. Also, additional identifiers may be linked with the web service policies within web service policy document 230 for different versions of WS-Policy. Because web service policy document 230 may be required to conform with a standard, it may not matter what manufacture's software platform is being used by web service 110.

Policy manager application 210, following the identifiers linked with the various service policies identified in web service policy document 230 being created, may search web service policy database 220 for each of these identifiers linked with the web service policies identified in web service policy document 230. If a match between an identifier linked with a web service policy present in web service policy document 230 and an identifier linked with a policy in web service policy database 220 is found, this may mean that the web service policies are compatible. While, in some embodiments, policy manager application 210 may identify only one common identifier between the identifiers linked with the web service policies of web service policy document 230 and the web service policies of web service policy database 220, in other embodiments, multiple identifiers may be common to both. As such, an opportunity may be present to select among the various web service policies compatible with both web service client 120 and web service 110. As such, if multiple identifiers are found in common to both web service policy database 220 and web service policy document 230, the common web service policies may be presented to a user, such as via user terminal 150, to allow the user to select which web service policies the user desires to be implemented between web service client 120 and web service 110.

Once the user has specified the web service policies that should be implemented, policy manager application 210 may transmit an indication to web service client 120 and/or web service 110 to specify the web service policy that is to be implemented at each entity. In some embodiments, policy manager application 210 may specify the selected web service policies to only web service client 120. In such embodiments, web service client 120 may provide an indication to web service 110 via network 160-1 of the web service policy to be implemented. Once web service client 120 and web service 110 are aware of the web service policies to be enforced between them, these web service policies may be enforced by policy enforcement points 130-1 and 130-2.

While network connections are illustrated between web service client 120, web service 110, and policy manager application 210, it should be understood that web service client 120, web service 110, and/or policy manager application 210 may communicate directly (that is, without the use of the network). Further, it should be understood that network connections may be present between policy manager application 210, user terminal 150, and/or web service policy database 220.

Figure 3:
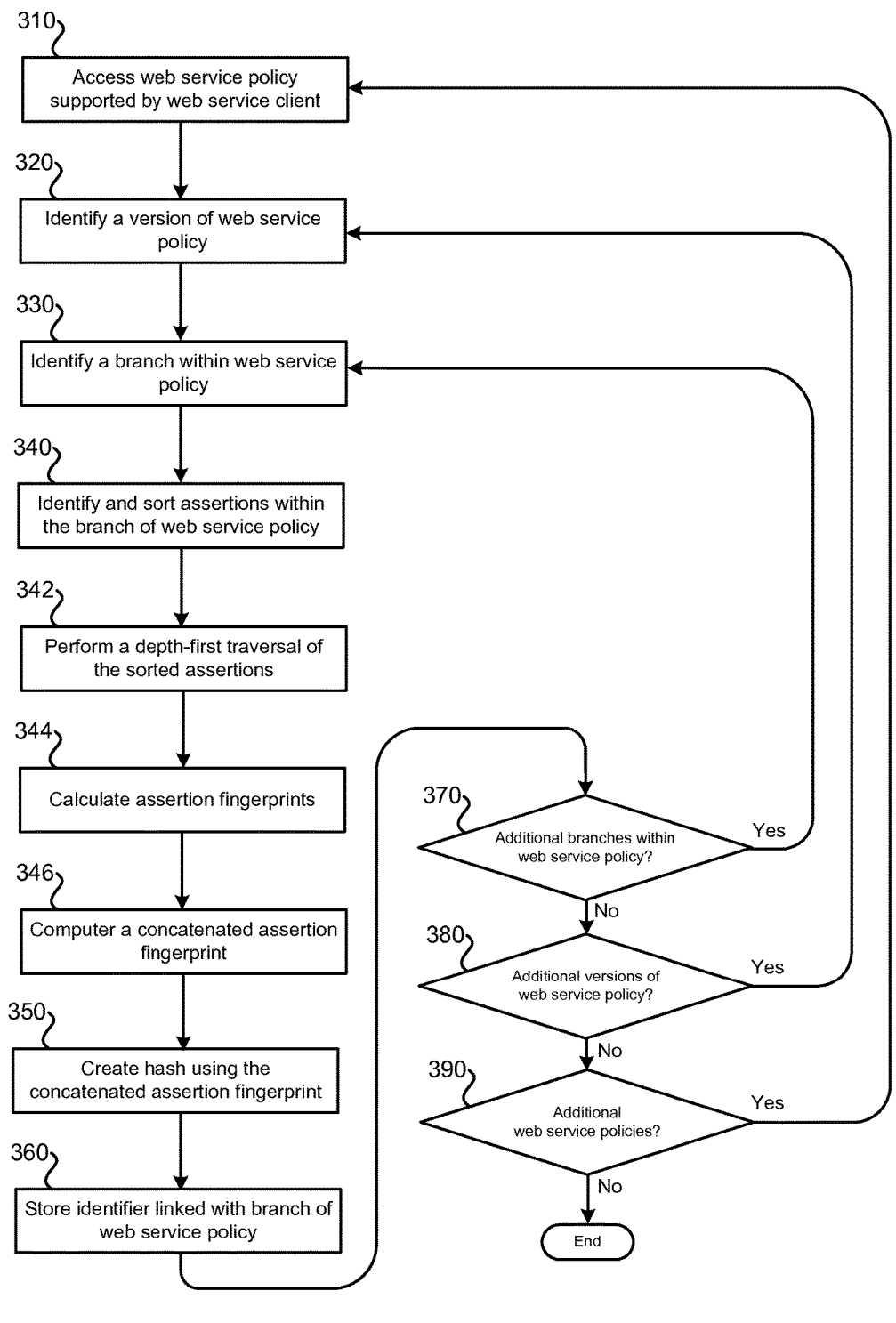
FIG. 3 illustrates an embodiment of a method for creating identifiers linked to web service policies that can be applied to a web service client.

FIG. 3 illustrates an embodiment of a method 300 for creating identifiers linked to web service policies of a web service client. Method 300 may be performed by a system for identifying compatible web service policies between a web service and a web service client, such as system 200 of FIG. 2. Method 300 may also be performed by other systems. For example, referring to system 200 of FIG. 2, web service policy database 220 may store multiple web service policies that are supported by web service client 120. Method 300 may be used to link one or more identifiers to each client policy stored in web service policy database 220. These identifiers may be used to shorten the period of time and decrease the amount of computation required to identify a web service policy supported by web service client 120 that is compatible with a service policy supported by a web service, such as web service 110, that web service client 120 is to interact with.

At stage 310, a database storing the various client policies supported by a web service client may be accessed. Referring to FIG. 2, this may involve policy manager application 210 accessing web service policy database 220. In some embodiments, web service policies supported by a web service client may be stored in an arrangement other than a database.

At stage 320, a first WS-Policy version of a web service policy supported by the web service client may be identified. For example, different versions of the web service policy may be present for WSDL versions 1.1, 1.2, and/or 2.0. At stage 330, a first branch within the first version of the web service policy may be identified. As an example of a situation where a branch exists in a web service policy, consider the WSDL element "ExactlyOne." When a list of web service policy assertions is wrapped by the "wsp: ExactlyOne" element, at least one of the policy assertions in the list may be required to evaluate as true. Therefore, only one of the assertions wrapped by "ExactlyOne" must be complied with. As such, each assertion that may alternatively be complied with can be considered a different branch. Each of these branches may have a different identifier evaluated for it. For example, if three different assertions are possible at an "ExactlyOne" branch, three identifiers may be created. Further, within a branch, nested branches can exist. Such nested branches can be treated similarly to branches, such that each nested branch has an identifier associated with it. As an example, if a "ExactlyOne" branch has three possible assertions, and each of those assertions has a nested branch with two possible "ExactlyOne" assertions, six identifiers may be created.

At stage 340, assertions within the branch identified in stage 330 and the version identified at stage 320 are identified and sorted. According to the semantics of WSDL, elements contained within a web policy may be classified as assertions or declarations. To create an identifier, only assertions may be used (declarations may be ignored). Each assertion within the branch may be lexicographically sorted (e.g., sorted in alphabetical order).

At stage 342, a depth-first traversal of the lexicographically sorted assertions identified at stage 340 may be performed. At stage 344, "assertion fingerprints" may be calculated for the sorted assertions. The assertion fingerprint for each assertion may be a string version of the name of each assertion. At stage 346, each of the assertion fingerprints may be used to create a concatenated assertion fingerprint. The concatenated assertion fingerprint may be a concatenation of each of the assertions fingerprints calculated at stage 344.

At stage 350, a hash is created using the concatenated assertion fingerprint. A hash may be created from an arbitrary sized block of data containing the assertions of the selected branch of the client policy. The hash may be a fixed length. Hash functions that may be used to create a hash include MD4, MD5, SHA-1 and SHA-2.

At stage 360, the hash created at stage 350 may be linked with the client policy. This hash may be used as the identifier. In some embodiments, the hash is stored as part of the web service policy. In some embodiments, the hash is linked with the web service policy and stored separately, such as part of a table.

At stage 370, it is determined whether additional branches within a web service policy are present. A depth-first search (DFS) can be used such that each branch of the client policy is evaluated. If additional branches are present, method 300 returns to stage 330 to compute identifiers for another branch. Stages 330 through 370 may repeat until all branches within the web service policy has had an identifier computed. If additional versions of a web service policy are determined to be present at stage 380, method 300 returns to stage 320 and repeats stages 320 through 380 for each additional WS-Policy version of the client policies. Finally, at stage 390, method 300 repeats stages 310 through 390 for other client policies stored in the web service policy database.

If, at stage 390, no additional web service policies are present, method 300 may end. As such, following method 300 being performed, each client policy in the web service policy database (or other storage arrangement) may have at least one identifier linked with it. In most instances, several identifiers may be linked with each client policy.

Figure 4:
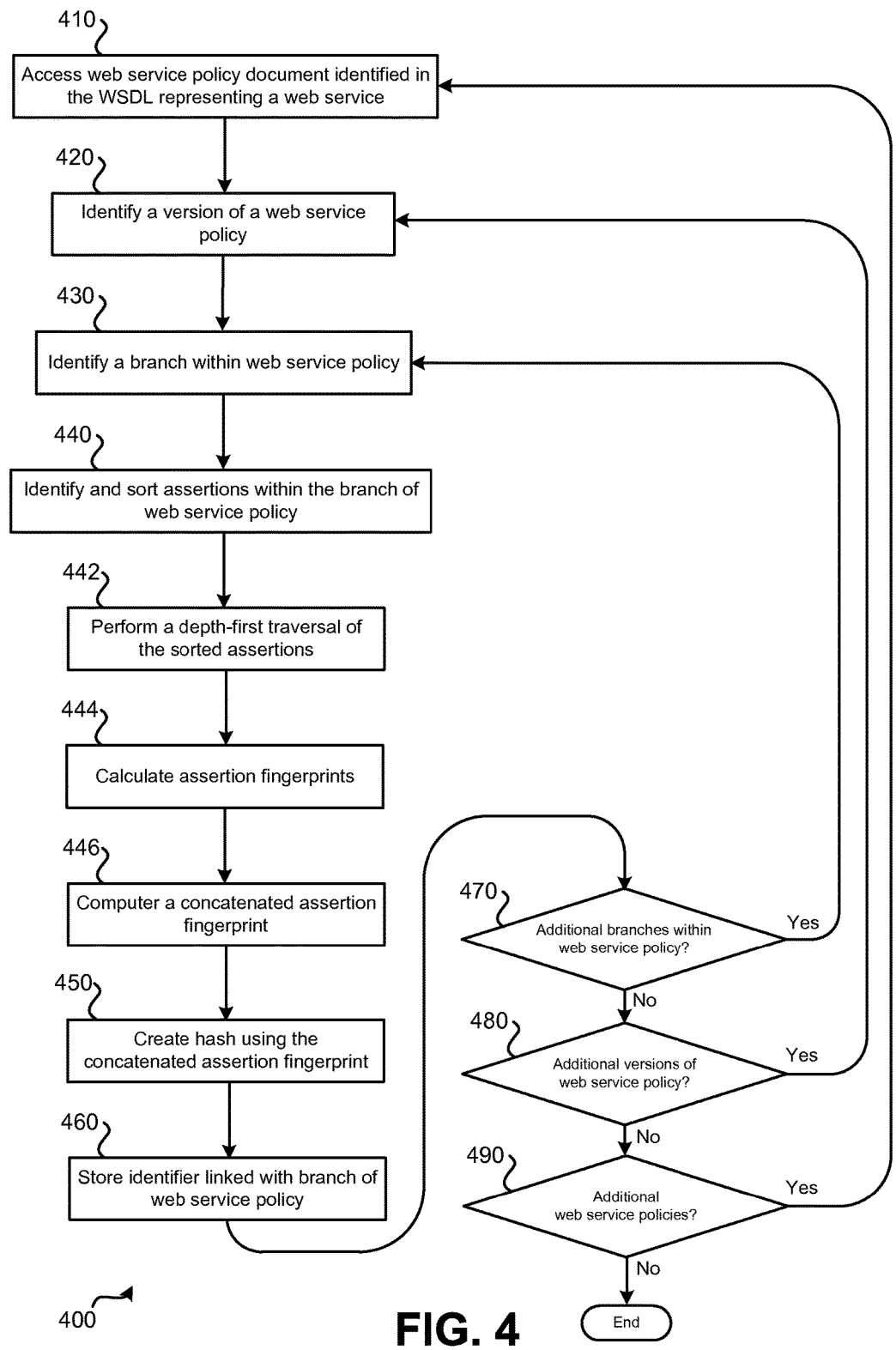
FIG. 4 illustrates an embodiment of a method for creating identifiers linked to web service policies of a web service.

FIG. 4 illustrates an embodiment of a method 400 for creating identifiers linked with service policies of a web service. Method 400 may be performed by a system for identifying compatible web service policies between a web service and a web service client, such as system 200 of FIG. 2. Method 400 may also be performed by other systems. For example, referring to system 200 of FIG. 2, a web service policy document that identifies one or more service policies may be received by web service client 120 from web service 110. Method 400 may be used to link one or more identifiers to each service policy identified in the web service policy document.

At stage 410, a web service policy document identified in the WSDL representing a web service may be accessed. The web service client may route the web service policy document to a policy manager application, such as policy manager application 210 of FIG. 2. In some embodiments, the service policies are analyzed by the web service client. At stage 410, a web service policy identified in the web service policy document is accessed.

At stage 420, a first WS-Policy version of a service policy described in the web service policy document may be identified. For example, different versions of the web service policy may be present for WSDL versions 1.1, 1.2, and/or 2.0. At stage 430, a first branch within the first version of the service policy may be identified. Further, within a branch, nested branches may exist. Such nested branches can be treated similarly to branches, such that each branch of a service policy has an identifier linked with it.

At stage 440, assertions within the branch identified at stage 430 and the version identified at stage 420 are identified and sorted. According to the semantics of WSDL, elements contained within a web policy may be classified as assertions or declarations. To create an identifier, only assertions may be used (declarations may be ignored). Each assertion within the branch may be lexicographically sorted (e.g., sorted in alphabetical order).

At stage 442, a depth-first traversal of the lexicographically sorted assertions identified at stage 440 may be performed. At stage 444, "assertion fingerprints" may be calculated for the sorted assertions. The assertion fingerprint for each assertion may be a string version of the name of each assertion. At stage 446, each of the assertion fingerprints may be used to create a concatenated assertion fingerprint. The concatenated assertion fingerprint may be a concatenation of each of the assertions fingerprints calculated at stage 444.

At stage 450, a hash is created using the concatenated assertion fingerprint. A hash may be created from an arbitrary sized block of data containing the assertions of the selected branch of the client policy. The hash may be a fixed length. Hash functions that may be used to create a hash include MD4, MD5, SHA-1 and SHA-2.

At stage 460, the hash created at stage 450 may be linked with the web service policy. The hash may be used as the identifier. In some embodiments, the hash is stored, at least temporarily, by the policy manager application or the web service client.

At stage 470, it is determined whether additional branches within a web service policy are present. As with client policies, a depth-first search technique may be used such that an identifier is produced for each branch of a service policy. Method 400 returns to stage 430 to compute identifiers for another branch if additional branches are present. Stages 430 through 470 may repeat until all branches within the web service policy have had an identifier computed and linked with the service policy. If additional versions of a service policy are determined to be present at stage 480, method 400 returns to stage 420 and repeats stages 420 through 480 for each additional WS-Policy version of a web service. Finally, at stage 490, method 400 repeats stages 410 through 490 for other web policies identified in the web service policy document.

If, at stage 490, no unanalyzed service policies are left in the web service policy document received from the web service, method 400 may end. As such, following method 400 being performed, each service policy described in the web service policy document may have at least one identifier linked with it. In most instances, several identifiers may be linked with each service policy.

Figure 5:
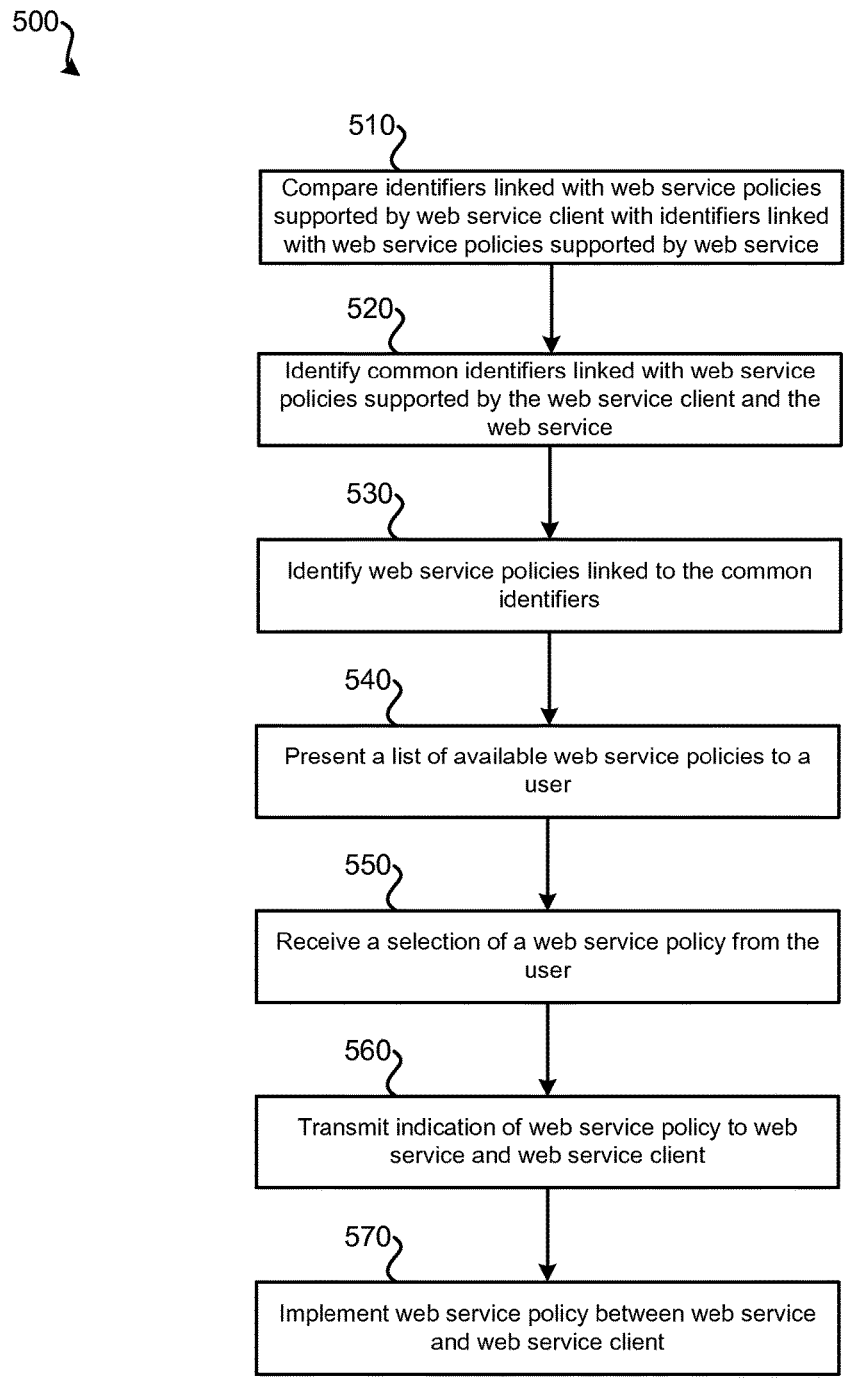
FIG. 5 illustrates an embodiment of a method for identifying compatible web service policies between a web service and a web service client.

FIG. 5 illustrates an embodiment of a method 500 for identifying compatible web service policies between a web service and a web service client. Method 500 may be performed by a system for identifying compatible web service policies between a web service and a web service client, such as system 200 of FIG. 2. Method 500 may also be performed by other systems. More specifically, method 500 may be performed by a policy manager application, such as policy manager application 210 of FIG. 2. Referring to system 200 of FIG. 2, method 500 may be performed after method 300 of FIG. 3 and method 400 of FIG. 4 have been performed. As such, identifiers may be linked with the client policies stored in web service policy database 220. Identifiers may also be linked with the service policies identified in the web service policy document received by web service client 120 from web service 110.

At stage 510, identifiers linked with client policies may be compared with identifiers linked with service policies. In order to compare the identifiers, a policy manager application may select a particular identifier linked with a service policy. The policy manager application may search the web service policy database (which contains the client policies) for the same identifier. This process may be repeated for each identifier linked with a service policy. As such, following stage 510, each identifier linked with a service policy may have been compared with each identifier linked with client policies in a web service policy database.

At stage 520, identifiers linked with client policies that match identifiers linked with service policies are identified. If two web service policies have linked identifiers having the same value, it is likely that the web service policies are compatible and that a branch of the web service policies used to create the identifiers are of the same version of WS-Policy and contain the same assertions. Therefore, for each common identifier identified, the linked web service policies may be implemented between the web service client and the web service.

At stage 530, the web service policies linked to the common identifiers are identified. If only one common identifier is found, the policy manager application may transmit an indication to web service client and the web service of the web service policy that should be implemented by the policy enforcement points of the web service client and the web service. In some embodiments, a user must confirm the web service policies to be implemented on the web server and web server client.

In some embodiments, the comparison of the identifiers may reveal that multiple common identifiers are present. In such a situation, the decision of which web policies should be implemented on the web service client and the web service may be made by a user. In some embodiments, a policy manager application may automatically select compatible web service policies for the web server and web server client. At stage 540, a list of the available Web service policies may be presented to a user. The list of available web policies may be presented to a user via a user terminal, such as user terminal 150 of FIG. 2. At stage 550, a selection of which web service policies are to be implemented may be received from the user. The selection may be received by the user terminal. The user terminal, in turn, may transmit the selection(s) to the policy manager application.

At stage 560, an indication may be transmitted by the policy manager application to the web service client and the web service that indicates the web service policy that is to be implemented by each entity and enforced between the two entities. In some embodiments, policy manager application transmits an indication of the web service policies to be implemented to only the web service client. In turn, the web service client transmits an indication of the service policy to be implemented to the web service. At stage 570, the web service policies selected by the user are implemented between the web service at the web service client by each entity's policy enforcement point. The web service client and the web service may then interact with each other with each entity's policy enforcement points handling the security as dictated by the web service policies selected by the user.

Figure 6:
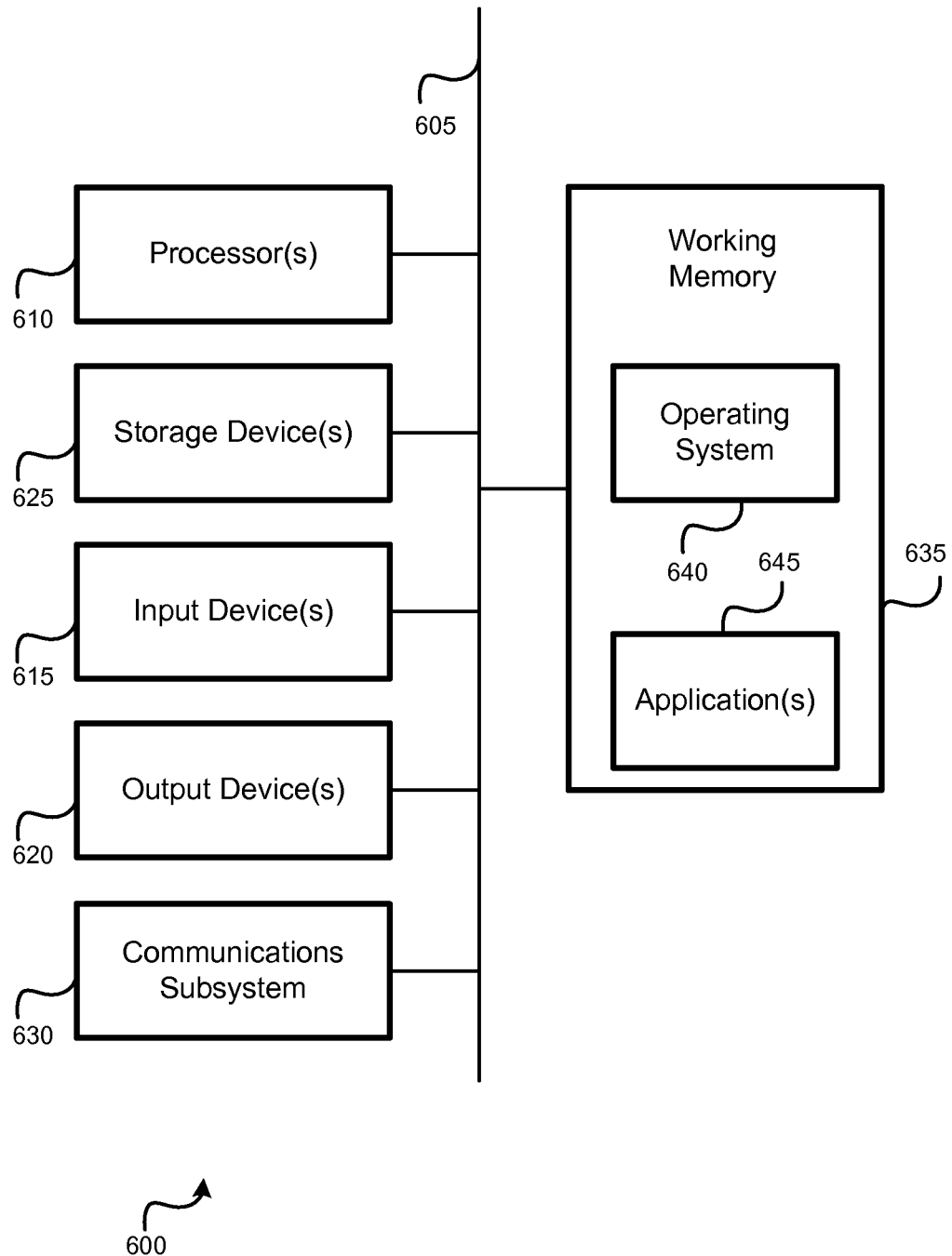
FIG. 6 illustrates an embodiment of a computer system.

FIG. 6 illustrates an embodiment of a computer system. A computer system as illustrated in FIG. 6 may be incorporated as part of the previously described computerized devices. For example, computer system 600 can be used to implement a web service, a web service client, a policy manager application, and/or a user terminal. FIG. 6 provides a schematic illustration of one embodiment of a computer system 600 that can perform the methods provided by various other embodiments, as described herein, and/or can function as the host computer system, a remote kiosk/terminal, a point-of-sale device, a mobile device, and/or a computer system. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of communications subsystem 630 (and/or the media by which the communications subsystem 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for identifying compatible web service policies, the method comprising:
   determining, by a computer system, a first set of identifiers by:
      identifying a version of a first web service policy supported by a web service client, and
      for each branch of the first web service policy in the version:
         identifying each assertion within the branch of the first web service policy, and
         creating an identifier from an arbitrary sized block of data containing each assertion within the branch of the first web service policy in the version;
   receiving, by the computer system, a second set of identifiers, wherein each identifier of the second set of identifiers is indicative of a branch of a second web service policy supported by a web service, and wherein each identifier in the second set of identifiers represents the branch of the second web service policy in a particular version of the second web service policy;
   comparing, by the computer system, the first set of identifiers supported by the web service client with the second set of identifiers supported by the web service;
   identifying, by the computer system, using the comparison of the first set of identifiers with the second set of identifiers, a first identifier from the first set of identifiers and a second identifier from the second set of identifiers, wherein the first identifier and the second identifier are the same value;
   determining, by the computer system, based on the first identifier and the second identifier being the same value, that the first web service policy and the second web service policy are compatible with each other; and
   enforcing, by the computer system based on the first web service policy and the second web service policy being compatible with each other, the compatible web service policy between the web service and the web service client.

2. The method for identifying the compatible web service policies of claim 1, wherein determining the first set of identifiers further comprises:
   for each branch of the first web service policy in the version:
      lexicographically sorting, by the computer system, the identified assertions within the branch.

3. The method for identifying the compatible web service policies of claim 1, wherein the computer system serves as the web service client.

4. The method for identifying the compatible web service policies of claim 1, wherein the computer system is distinct from a web service computer system executing the web service and a web service client computer system executing the web service client.

5. The method for identifying the compatible web service policies of claim 1, wherein creating an identifier comprises:
creating a string, the string comprising a name of each of the identified assertions of the branch.

6. The method for identifying the compatible web service policies of claim 5, wherein creating an identifier further comprises:
calculating a hash based on the string of the names of the identified assertions, wherein the first set of identifiers is a plurality of hashes that includes the hash.

7. The method for identifying the compatible web service policies of claim 1, wherein identifying the version of the first web service policy comprises determining identifiers corresponding to different web service description language (WSDL) versions.

8. A system for identifying compatible web service policies, the system comprising:
one or more processors; and
a memory communicatively coupled with and readable by the one or more processors and having stored therein processor-readable instructions which, when executed by the one or more processors, cause the one or more processors to:
determine a first set of identifiers by:
identifying a version of a first web service policy supported by a web service client, and
for each branch of the first web service policy in the version:
identifying each assertion within the branch of the first web service policy, and
creating an identifier from an arbitrary sized block of data containing each assertion within the branch of the first web service policy in the version;
receive a second set of identifiers, wherein each identifier of the second set of identifiers is indicative of a branch of a second web service policy supported by a web service, and wherein each identifier in the second set of identifiers represents the branch of the second web service policy in a particular version of the second web service policy;
compare the first set of identifiers supported by the web service client with the second set of identifiers supported by the web service;
identify, using the comparison of the first set of identifiers with the second set of identifiers, a first identifier from the first set of identifiers and a second identifier from the second set of identifiers, wherein the first identifier and the second identifier are the same value;
determine, based on the first identifier and the second identifier being the same value, that the first web service policy and the second web service policy are compatible with each other; and
enforce, based on the first web service policy and the second web service policy being compatible with each other, the compatible web service policy between the web service and the web service client.

9. The system for identifying the compatible web service policies of claim 8, wherein the processor-readable instructions that determine the first set of identifiers further comprises instructions that, when executed, cause the one or more processors to:
for each branch of the first web service policy in the version:
lexicographically sort the identified assertions within the branch.

10. The system for identifying the compatible web service policies of claim 8, wherein the processor-readable instructions, when executed, further cause the one or more processors to:
execute the web service client.

11. The system for identifying the compatible web service policies of claim 8, wherein the system further comprises:
a web service client computer system configured to execute the web service client; and
a web service computer system configured to execute the web service.

12. The system for identifying the compatible web service policies of claim 8, wherein the processor-readable instructions that, when executed, cause the one or more processors to create an identifier comprise processor-readable instructions which, when executed, cause the one or more processors to:
create a string, the string comprising a name of each of the identified assertions of the branch.

13. The system for identifying the compatible web service policies of claim 12, wherein the processor-readable instructions that, when executed, cause the one or more processors to create an identifier further comprise processor-readable instructions which, when executed, cause the one or more processors to:
calculate a hash based on the string of the names of the identified assertions, wherein the first set of identifiers is a plurality of hashes that includes the hash.

14. The system for identifying the compatible web service policies of claim 8, wherein the processor-readable instructions that, when executed, cause the one or more processors to identify the version of the first web service policy comprise processor-readable instructions which, when executed, cause the one or more processors to:
determine identifiers corresponding to different web service description language (WSDL) versions.

15. A non-transitory processor-readable medium for identifying compatible web service policies, comprising processor-readable instructions configured to cause one or more processors to:
determine a first set of identifiers by:
identifying a version of a first web service policy supported by a web service client, and
for each branch of the first web service policy in the version:
identifying each assertion within the branch of the first web service policy, and
creating an identifier from an arbitrary sized block of data containing each assertion within the branch of the first web service policy in the version;
receive a second set of identifiers, wherein each identifier of the second set of identifiers is indicative of a branch of a second web service policy supported by a web service, and wherein each identifier in the second set of identifiers represents the branch of the second web service policy in a particular version of the second web service policy;
compare the first set of identifiers supported by the web service client with the second set of identifiers supported by the web service;

identify, using the comparison of the first set of identifiers with the second set of identifiers, a first identifier from the first set of identifiers and a second identifier from the second set of identifiers, wherein the first identifier and the second identifier are the same value;

determine, based on the first identifier and the second identifier being the same value, that the first web service policy and the second web service policy are compatible with each other; and enforce, based on the first web service policy and the second web service policy being compatible with each other, the compatible web service policy between the web service and the web service client.

16. The non-transitory processor-readable medium for identifying the compatible web service policies of claim 15, wherein the processor-readable instructions configured to cause the one or more processors to determine the first set of identifiers further comprise processor-readable instructions configured to cause the one or more processors to:

for each branch of the first web service policy in the version:
lexicographically sort the identified assertions within the branch.

17. The non-transitory processor-readable medium for identifying the compatible web service policies of claim 15, wherein the processor-readable instructions are further configured to cause the one or more processors to:

execute the web service client.

18. The non-transitory processor-readable medium for identifying the compatible web service policies of claim 15, wherein the processor-readable instructions configured to cause the one or more processors to create an identifier comprise processor-readable instructions configured to cause the one or more processors to:

create a string, the string comprising a name of each of the identified assertions of the branch.

19. The non-transitory processor-readable medium for identifying the compatible web service policies of claim 18, wherein the processor-readable instructions configured to cause the one or more processors to create an identifier further comprise processor-readable instructions configured to cause the one or more processors to:

calculate a hash based on the string of the names of the identified assertions, wherein the first set of identifiers is a plurality of hashes that includes the hash.

20. The non-transitory processor-readable medium for identifying the compatible web service policies of claim 15, wherein the processor-readable instructions configured to cause the one or more processors to identify the version of the first web service policy comprise processor-readable instructions configured to cause the one or more processors to:

determine identifiers corresponding to different web service description language (WSDL) versions.

* * * * *